United States Patent [19]
Patti

[11] Patent Number: 5,522,743
[45] Date of Patent: Jun. 4, 1996

[54] MARINE PROPELLER WITH RUBBER BUSHING HAVING LOBULAR CONFIGURATION

[75] Inventor: Frank A. Patti, Greenfield, Wis.

[73] Assignee: Outboard Marine Corporation, Waukegan, Ill.

[21] Appl. No.: 368,660

[22] Filed: Jan. 4, 1995

[51] Int. Cl.$^6$ ................................................ B63H 21/30
[52] U.S. Cl. .................... 440/52; 416/134 R; 416/244 B
[58] Field of Search ..................... 440/49, 52; 416/93 A, 416/131, 135, 134 R, 244 B

[56] References Cited

U.S. PATENT DOCUMENTS

| | | |
|---|---|---|
| 1,402,463 | 1/1922 | Wilson . |
| 2,543,396 | 2/1951 | Wolff .................................. 64/30 |
| 3,113,625 | 12/1963 | Conover ......................... 170/135.75 |
| 3,356,151 | 12/1967 | Strang .......................... 170/135.71 |
| 3,563,670 | 2/1971 | Knuth ................................ 416/93 |
| 3,748,061 | 7/1973 | Henrich ............................. 416/93 |
| 4,642,057 | 2/1987 | Frazzell et al. ..................... 440/52 |
| 5,244,348 | 9/1993 | Karls et al. .................... 416/204 R |
| 5,252,028 | 10/1993 | LoBosco et al. .................... 440/52 |
| 5,322,416 | 6/1994 | Karls et al. .................... 416/204 R |

*Primary Examiner*—Stephen Avila
*Attorney, Agent, or Firm*—Michael, Best & Friedrich

[57] ABSTRACT

Disclosed herein is a marine propeller comprising a marine propeller comprising an inner bushing adapted to be mounted on a propeller shaft for common rotation therewith and having an axis and an outer surface, a resilient bushing fixed to said outer surface of said inner bushing and having a cylindrical outer surface extending, when relaxed, at a first radial distance from said bushing axis, an outer bushing having an inner bore defined by a lobular surface having a maximum radial distance from said bushing axis less than said first radial distance, receiving said resilient bushing in a compressed condition and with said lobular surface in continuous circumferentially extending engagement with said outer surface of said resilient bushing, and comprising a series of inwardly concave cylindrical segments, and a series of blades extending radially outwardly from said outer bushing.

20 Claims, 1 Drawing Sheet

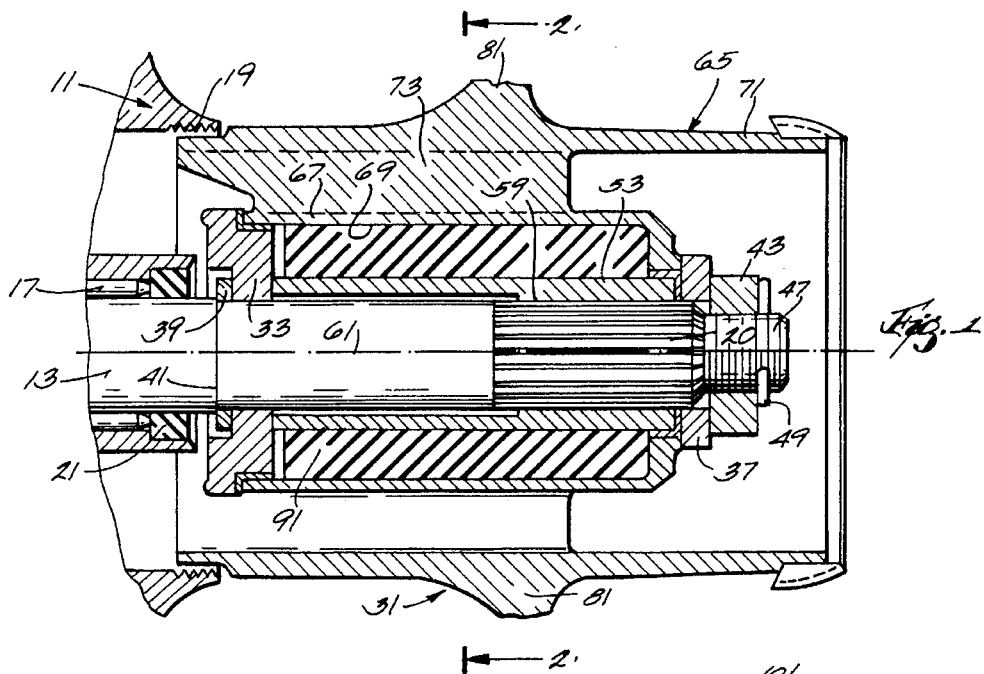
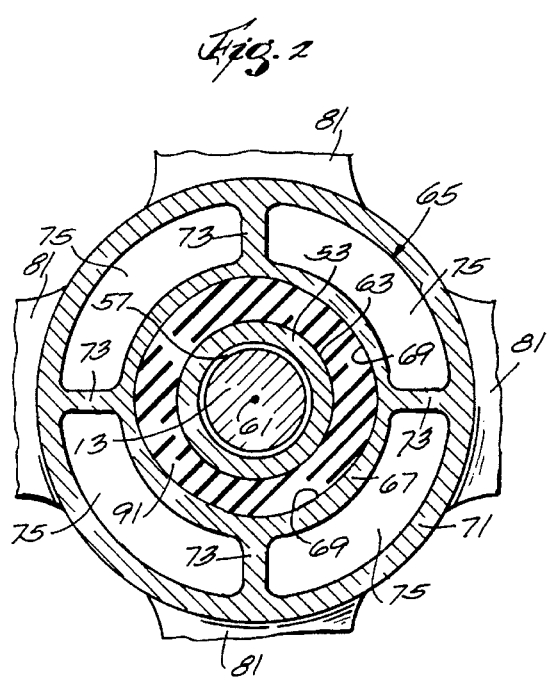
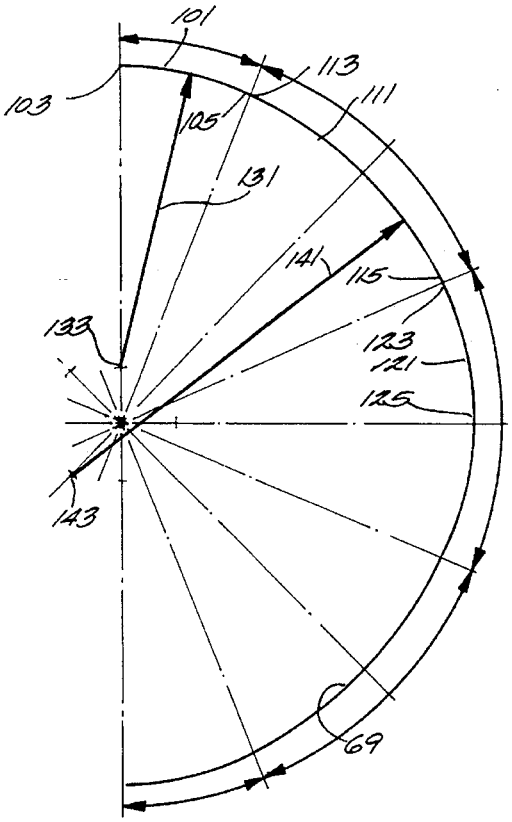

5,522,743

MARINE PROPELLER WITH RUBBER BUSHING HAVING LOBULAR CONFIGURATION

BACKGROUND OF THE INVENTION

The invention relates generally to propellers and partially to marine propellers.

In the past, it has been known to construct marine propellers with inner and outer hubs or sleeves or bushings which were bonded to an intervening annulus of rubber or other like material. One such prior construction is shown in the Strang U.S. Pat. No. 3,356,151, issued Dec. 5, 1967.

The above-identified Strang patent, as well as the Conover U.S. Pat. No. 3,113,625, the Wolff U.S. Pat. No. 2,543,396, and the Knoth U.S. Pat. No. 3,563,670, disclose a rubber annulus which is under radial compression in order to afford torque transmission while also affording rotary slippage relative to a hub in the event of an overload condition. The radial compression is exerted through forces applied by concentric hubs or sleeves or bushings located radially inwardly and outwardly of the annulus. Such radially applied forces provide frictional restraint to rotary slippage under normal torque transmission conditions. However, such radial forces also preclude axial separation in the field between the relatively rotatable hub and annulus.

Attention is also directed to the following U.S. Pat. Nos.:

1,402,463
3,748,061
5,244,348
5,252,028
5,322,416

SUMMARY OF THE INVENTION

The invention provides a marine propeller comprising a marine propeller comprising an inner bushing adapted to be mounted on a propeller shaft for common rotation therewith and having an axis and an outer surface, a resilient bushing fixed to said outer surface of said inner bushing and having a cylindrical outer surface extending, when relaxed, at a first radial distance from said bushing axis, an outer bushing having an inner bore defined by a lobular surface having a maximum radial distance from said bushing axis less than said first radial distance, receiving said resilient bushing in a compressed condition and with said lobular surface in continuous circumferentially extending engagement with said outer surface of said resilient bushing, and comprising a series of inwardly concave cylindrical segments, and a series of blades extending radially outwardly from said outer bushing.

The invention also provides a marine propeller comprising a marine propeller comprising an inner bushing adapted to be mounted on a propeller shaft for common rotation therewith and having an axis and an outer surface, a resilient bushing bonded to said outer surface of said inner bushing and having a cylindrical outer surface extending, when relaxed, at a first radial distance from said bushing axis, an outer bushing having an inner bore defined by a lobular surface receiving said resilient bushing in a compressed condition and with said lobular surface in continuously extending engagement with said outer surface of said resilient bushing, and comprising a series of segments including a first inwardly concave cylindrical segment having an outer end at a second radial distance from said bushing axis less than said first radial distance, and an inner end at a third radial distance from said bushing axis less than said second radial distance, a second inwardly concave cylindrical segment having a first end extending from said inner end of said first segment, and a second end at said third radial distance, and a third inwardly concave cylindrical segment having an inner end extending from said second end of said second segment, and an outer end at said second radial distance, and a series of blades extending radially outwardly from said outer bushing.

The invention also provides a marine propeller comprising a marine propeller comprising an inner bushing adapted to be mounted on a propeller shaft for common rotation therewith and having an axis and an outer surface concentric with said axis, a resilient bushing bonded to said outer surface of said inner bushing and having a cylindrical outer surface extending, when relaxed, at a first radial distance from said bushing axis, an outer bushing including an inner sleeve including an inner bore defined by a lobular surface receiving said resilient bushing in a compressed condition and with said lobular surface in continuously extending engagement with said outer surface of said resilient bushing, and comprising four series of segments, each series including a first inwardly concave cylindrical segment having an outer end at a second radial distance from said bushing axis less than said first radial distance, and an inner end at a third radial distance from said bushing axis less than said second radial distance, a second inwardly concave cylindrical segment having a first end extending from said inner end of said first segment, and a second end at said third radial distance, and a third inwardly concave cylindrical segment having an inner end extending from said second end of said second segment, and an outer end at said second radial distance, an outer sleeve in radially outwardly spaced relation from said inner sleeve, and a series of four arcuately spaced radially outwardly extending ribs integrally connecting said inner and outer sleeves and extending in respective alignment with said outer ends of said first segments, and a series of four blades extending radially outwardly from said outer bushing in respective alignment with said ribs.

Other advantages of the invention will become known by reference to the following description and accompanying drawings.

DESCRIPTION OF THE DRAWINGS

FIG. 1 is a fragmentary sectional view of a marine propulsion device including a propeller embodying various of the features of the invention.

FIG. 2 is a sectional view taken generally along line 2—2 of FIG. 1.

FIG. 3 is an enlarged view of the surface of the inner bore of the inner sleeve of the outer bushing included in the marine propeller shown in FIG. 1.

Before one embodiment of the invention is explained in detail, it is to be understood that the invention is not limited in its application to the details of the construction and the arrangemetns or components set forth in the following description or illustrated in the drawings. The invention is capable of other embodiments and of being practiced or being carried out in various ways. Also, it is to be understood that phraseology and terminology used herein is for the purpose of description and should not be regarded as limiting.

DETAILED DESCRIPTION

Shown fragmentarily in FIG. 1 is a part of a lower unit 11 of a marine propulsion device such as, for instance, a stern drive unit or an outboard motor. Extending from the lower unit 11 is a propeller shaft 13 which can be of any suitable construction, which is suitably journaled within the lower unit 11 by bearings 17, which projects centrally through a generally annular exhaust gas discharge outlet 19, and which includes an exteriorly splined portion 20. As shown, a seal 21 can also be employed between the propeller shaft 13 and the lower unit 11 to prevent water reaching the bearings 17.

Mounted on the propeller shaft 13 rearwardly of the lower unit 11 is a propeller 31 in general accordance with the invention. The propeller 31 is mounted on the propeller shaft 13 between a forwardly located thrust bearing and sleeve assembly 33 and a rearwardly located spacer or washer 37. Thrust from the thrust bearing and sleeve assembly 33 is transmitted to the propeller shaft 13 by a thrust washer 39 which is engaged against a shoulder 41 on the propeller shaft 13. At the rearward end, the washer 37 is held in position by a nut 43 threaded on a terminal portion 47 of the propeller shaft 13. A cotter pin 49 prevents unwanted movement of the nut 43 on the threaded portion 47 of the propeller shaft 13.

The propeller 31 includes an inner sleeve or bushing or hub 53 which is adapted to be received on the propeller shaft 13 and, accordingly, has an internal bore 57 including a splined portion 59 adapted to interfit with the splined portion 20 of the propeller shaft 13. The inner bushing 53 also includes a axis 61 and an outer cylindrical surface 63 which is concentric with the axis 61.

The propeller 31 also includes an outer bushing 65 including an inner sleeve 67 including an inner bore 69, an outer sleeve 71 in radially outwardly spaced relation from the inner sleeve 67, and a series of arcuately spaced radially outwardly extending ribs 73 integrally connecting the inner and outer sleeves 67 and 71, and defining therebetween and between the inner hub 53 and the inner sleeve 67, a plurality of exhaust gas discharge passages 75. While other constructions can be employed, in the disclosed construction, there are four of such ribs 73 located in equi-angularly spaced relation to each other.

The propeller 31 also includes a series of radially extending (fragmentarily shown) propeller blades 81 which extend from the outer sleeve 71. While other constructions can be employed, in the disclosed construction, there are four of such propeller blades 81 in respective alignment with the ribs 73.

The propeller 31 also includes a resilient drive connection in the form of a bushing 91 which is fabricated of rubber of rubber-like material and which is bonded or otherwise suitably fixed to the outer surface 63 of the inner bushing 53 and which engages the inner bore 69 of the inner sleeve 67 of the outer bushing 65 to afford torque transmission under normal loading, and, in the event of overloading, both shock absorption and rotary slip clutch capacity.

As thus far disclosed, the illustrated construction is conventional. It should also be understood that while the illustrated construction employs a so-called "through-the-prop" exhaust gas discharge system, the invention is not limited thereto and also extends to constructions wherein the exhaust gas exits around the surface from which the blades extend and to constructions wherein the exhaust gas is discharged from a snout or opening (not shown) which forms a part of the lower unit and which is located in spaced relation to the propeller.

In accordance with the invention, the resilient bushing 91 includes, when in relaxed condition, i.e., not under compression, a cylindrical outer surface which is located at a first radial distance from the axis 61. While other constructions can be employed, in the disclosed construction, the first radial distance is 1.355 inches. In addition, the inner bore 69 of the outer bushing 65 (the inner sleeve 67 in the illustrated construction) is provided with a lobular or scallopped surface which is continuously circumferentially engaged by the resilient bushing 91 consequent to compression thereof incident to assembly of the resilient bushing 91 into the inner bore 69 of the inner sleeve 67 of the outer bushing 65. The lobiular surface of the inner bore 69 comprises a plurality of series of inwardly arcuate cylindrical segments, each series including a first inwardly concave arcuate cylindrical segment 101 having a first or outer end 103 at a second radial distance from the axis 61 less than the first radial distance and aligned with one of the ribs 73, and a second or inner end 105 at a third radial distance from the axis 61 less than the second radial distance, a second inwardly concave arcuate cylindrical segment 111 having a first end 113 extending from the inner end 105 of the first segment 101, and a second end 115 at the third radial distance, and a third inwardly concave arcuate cylindrical segment 121 having a first or inner end 123 extending from the second end 115 of the second segment 111, and a second or outer end 125 at the second radial distance and aligned with the next one of the ribs 73. The next series of cylindrical segments begins at the outer end 125 of the third segment 121.

While other constructions a can be employed, in the disclosed construction, the second radial distance is about 0.012 inches less than the first radial distance, and the third radial distance is about 0.029 inches less than the second radial distance. As a consequence, when the resilient bushing is assembled in the inner bore, the resilient bushing 91 is compressed and the outer surface thereof continuously peripherally engages the inner bore 69.

While other constructions can be employed, in the disclosed construction, the third and first segments 121 and 101 each extend for 22.5 degrees and comprise one composite curve which extends continously for 45 degrees at a common radius 131 of 0.966 inches from a center 133 located on a radial line extending from the axis 61 and bisecting the composite 45 degree curve and at a distance of 0.169 inches from the axis 61 in the direction toward the composite curve. The second segment 111 comprises one curve which extends continously for 45 degrees at a common radius 141 of 1.343 inches from a center 143 which is located on a radial line extending from the axis 61 and bisecting the 45 degrees and at a distance of 0.238 inches from the axis 61 in the direction away from the segment 111.

As a consequence of the construction described above, the engaged surface area betweeen the resilient bushing 91 and the inner sleeve 67 of the outer bushing 65 is increased and some shear loading reductuion is achieved. Because the inwardly concave segments 101, 111, and 121 grip the resilient bushing 91 and because of the inwardly concave configuration of the arcuate segments 101, 111, and 121 requires additional compression of the bushing 91 before slippage can occur, such slippage of the outer hub 65 relative to the inner hub or bushing 53 is reduced or eliminated under conditions of high speed or high torque when the exhaust gas tends to be excessively hot and, in some prior constructions, softened the prior resilient bushing to such an extent that the outer configuration was sufficiently deformable to permit slippage beteeen the resilient bushing and the immediately outwardly located bushing or sleeve, thereby losing the ability to transmit torque.

Various of the features of the invention are set forth in the following claims.

I claim:

1. A marine propeller comprising an inner bushing adapted to be mounted on a propeller shaft for common rotation therewith and having an axis and an outer surface, a resilient bushing fixed to said outer surface of said inner bushing and having a cylindrical outer surface extending, when relaxed, at a first radial distance from said bushing axis, an outer bushing having an inner bore defined by a lobular surface having a maximum radial distance from said bushing axis less than said first radial distance, receiving said resilient bushing in a compressed condition and with said lobular surface in continuous circumferentially extending engagement with said outer surface of said resilient bushing, and comprising a series of inwardly concave cylindrical segments, and a series of blades extending radially outwardly from said outer bushing.

2. A marine propeller in accordance with claim 1 wherein said propeller includes a plurality of said series of inwardly concave segments.

3. A marine propeller in accordance with claim 1 wherein said series of segments includes a first segment having an outer end at a second radial distance from said bushing axis less than said first radial distance, and an inner end at a third radial distance from said bushing axis less than said second radial distance, and a second segment having a first end extending from said inner end of said first segment, and a second end at said third radial distance, and a third segment having an inner end extending from said second end of said second segment, and an outer end at said second radial distance.

4. A marine propeller in accordance with claim 3 wherein said second radial distance is about 0.219 inches less than said second radial distance, and wherein said third radial distance is about 0.029 inches less than said second radial distance.

5. A marine propeller in accordance with claim 3 wherein said first and third segments are respectively defined by a first radius, and wherein said second segmment is defined by a second radius.

6. A marine propeller in accordance with claim 5 wherein said first and second radii extend from respective centers offset from said bushing axis.

7. A marine propeller comprising an inner bushing adapted to be mounted on a propeller shaft for common rotation therewith and having an axis and an outer surface, a resilient bushing bonded to said outer surface of said inner bushing and having a cylindrical outer surface extending, when relaxed, at a first radial distance from said bushing axis, an outer bushing having an inner bore defined by a lobular surface receiving said resilient bushing in a compressed condition and with said lobular surface in continuously extending engagement with said outer surface of said resilient bushing, and comprising a series of segments including a first inwardly concave cylindrical segment having an outer end at a second radial distance from said bushing axis less than said first radial distance, and an inner end at a third radial distance from said bushing axis less than said second radial distance, a second inwardly concave cylindrical segment having a first end extending from said inner end of said first segment, and a second end at said third radial distance, and a third inwardly concave cylindrical segment having an inner end extending from said second end of said second segment, and an outer end at said second radial distance, and a series of blades extending radially outwardly from said outer bushing.

8. A marine propeller in accordance with claim 7 wherein said propeller includes a plurality of said series of inwardly arcuate segments.

9. A marine propeller in accordance with claim 7 wherein said second radial distance is about 0.219 inches less than said first radial distance, and wherein said third radial distance is about 0.029 inches less than said second radial distance.

10. A marine propeller in accordance with claim 7 wherein said first and third segments are respectively defined by a first radius, and wherein said second segmment is defined by a second radius.

11. A marine propeller in accordance with claim 10 wherein said first and second radii extend from respective centers spaced from said bushing axis.

12. A marine propeller in accordance with claim 7 wherein said outer bushing includes an outer surface, and wherein said blades extend from said outer surface of said outer bushing.

13. A marine propeller in accordance with claim 7 wherein said outer bushing includes an inner sleeve including said inner bore, an outer sleeve in radially outwardly spaced relation from said inner sleeve, and a series of arcuately spaced radially outwardly extending ribs integrally connecting said inner and outer sleeves.

14. A marine propeller in accordance with claim 13 wherein said outer sleeve includes an outer surface, and wherein said blades extend from said outer surface of said outer sleeve.

15. A marine propeller in accordance with claim 13 wherein said ribs are four in number, wherein said series of arcuate segments are four in number, and wherein said outer ends of said first segments are angularly aligned with said ribs.

16. A marine propeller comprising an inner bushing adapted to be mounted on a propeller shaft for common rotation therewith and having an axis and an outer surface concentric with said axis, a resilient bushing bonded to said outer surface of said inner bushing and having a cylindrical outer surface extending, when relaxed, at a first radial distance from said bushing axis, an outer bushing including an inner sleeve including an inner bore defined by a lobular surface receiving said resilient bushing in a compressed condition and with said lobular surface in continuously extending engagement with said outer surface of said resilient bushing, and comprising four series of segments, each series including a first inwardly concave cylindrical segment having an outer end at a second radial distance from said bushing axis less than said first radial distance, and an inner end at a third radial distance from said bushing axis less than said second radial distance, a second inwardly concave cylindrical segment having a first end extending from said inner end of said first segment, and a second end at said third radial distance, and a third inwardly concave cylindrical segment having an inner end extending from said second end of said second segment, and an outer end at said second radial distance, an outer sleeve in radially outwardly spaced relation from said inner sleeve, and a series of four arcuately spaced radially outwardly extending ribs integrally connecting said inner and outer sleeves and extending in respective alignment with said outer ends of said first segments, and a series of four blades extending radially outwardly from said outer bushing in respective alignment with said ribs.

17. A marine propeller in accordance with claim 16 wherein said second radial distance is about 0.219 inches less than said first radial distance.

18. A marine propeller in accordance with claim 17 wherein said third radial distance is about 0.029 inches less than said second radial distance.

19. A marine propeller in accordance with claim 16 wherein said first and third segments are respectively defined by a first radius, and wherein said second segmment is defined by a second radius.

20. A marine propeller in accordance with claim 19 wherein said first and second radii extend from respective centers offset from said bushing axis.

* * * * *